United States Patent [19]

Klein et al.

[11] Patent Number: 5,726,885
[45] Date of Patent: Mar. 10, 1998

[54] HIRE VEHICLE TRANSPORTATION SYSTEM

[75] Inventors: Konrad Klein, Ostfildern; Günter Metsch, Möglingen, both of Germany

[73] Assignee: Daimler-Benz AG, Germany

[21] Appl. No.: 518,420

[22] Filed: Aug. 23, 1995

[30] Foreign Application Priority Data

Aug. 23, 1994 [DE] Germany .................. 44 29 852.8

[51] Int. Cl.⁶ .................................................. G06F 19/00
[52] U.S. Cl. .................. 364/423.098; 395/205; 235/384
[58] Field of Search ................ 364/423.098; 340/932.2, 340/937, 825.31, 825.32, 825.34, 825.36; 235/381, 384; 395/205, 206

[56] References Cited

U.S. PATENT DOCUMENTS

| | | | |
|---|---|---|---|
| 5,066,853 | 11/1991 | Brisson | 235/381 |
| 5,206,643 | 4/1993 | Eckelt | 340/932.2 |
| 5,253,165 | 10/1993 | Leiseca et al. | 395/205 |
| 5,289,369 | 2/1994 | Hirshberg | 395/205 |
| 5,309,355 | 5/1994 | Lockwood | 395/206 |
| 5,311,425 | 5/1994 | Inada | 395/206 |

FOREIGN PATENT DOCUMENTS

| | | |
|---|---|---|
| 0 309 318 | 3/1989 | European Pat. Off. |
| 0 433 740 | 6/1991 | European Pat. Off. |
| 0 451 482 | 10/1991 | European Pat. Off. |
| 2 612 319 | 9/1988 | France. |
| 2 656 450 | 6/1991 | France. |
| 2 662 285 | 11/1991 | France. |
| 22 10 088 | 10/1972 | Germany. |
| 39 27 994 | 2/1991 | Germany. |
| 42 27 969 | 3/1994 | Germany. |
| 56-9889 | 1/1981 | Japan. |
| 61-210497 | 9/1986 | Japan. |
| 61-224098 | 10/1986 | Japan. |
| 63-67672 | 3/1988 | Japan. |
| 1-100671 | 4/1989 | Japan. |
| 2-309493 | 12/1990 | Japan. |
| 3-184164 | 8/1991 | Japan. |
| 5-159143 | 6/1993 | Japan. |
| 6-36100 | 2/1994 | Japan. |
| 6-36101 | 2/1994 | Japan. |
| 6-68095 | 3/1994 | Japan. |
| 6-68390 | 3/1994 | Japan. |
| 603231 | 7/1994 | Japan. |
| 61-2249097 | 10/1997 | Japan. |
| 668 324 | 12/1988 | Switzerland. |
| 1377284 | 3/1971 | United Kingdom. |
| 2 178 211 | 2/1987 | United Kingdom. |
| 89/04901 | 6/1989 | WIPO. |

*Primary Examiner*—Gary Chin
*Attorney, Agent, or Firm*—Evenson, McKeown, Edwards & Lenahan, P.L.L.C.

[57] ABSTRACT

The invention provides a hire vehicle transport system of the type in which a plurality of usable vehicles are available for hire at one or more collection and return points, and a control center performs control and monitoring functions. The collection and return points are equipped with automatic collection and return machines which issue, to authorized persons, driving authorizations for the vehicles parked at the respective collection and return point in the form of associated vehicle keys and take back again the keys of the vehicles parked there at the end of the journey. The automatic collection and return machines have a data exchange link with the control center. According to the invention, the control center is configured as a disposition center which ascertains the individual availability of vehicles at the collection and return points and makes reservations for individual vehicles using the availability analysis. At the same time, the control center can carry out spontaneous vehicle hire procedures for vehicles which have not been reserved.

9 Claims, 2 Drawing Sheets

HIRE VEHICLE TRANSPORTATION SYSTEM

BACKGROUND AND SUMMARY OF THE INVENTION

The invention relates to a hire vehicle transportation system which includes a pool of available vehicles, with a plurality of designated vehicle collection and return points, each having an automated collection and return machine for verifying driver identity and the like, and a central control linked in communication with the collection and return machines. A system of this type is capable of efficiently making available individually usable vehicles in areas in which, for different reasons, unlimited individual transport with private vehicles is not possible, or not desirable. In such a system, the vehicles are preferably hired for a short period, to make a specific journey. Collection and return points are located within the area, each with automatic collection and return machinery, at which an authorized system user can collect or return a vehicle from the pool of vehicles, so that the vehicle does not have to be returned at the collection and return point at which it was hired out.

In contrast with customary car hire systems in which vehicles are issued at the collection and return points by personnel employed there, such a hire vehicle transport system is completely automated on the collection and return side. In contrast with taxi systems, this system is a self-drive transport system. Furthermore, in comparison with the local public transport system the present type of transport system has the advantage of being independent of timetables and providing better area coverage.

A system of the generic type is described in the German Patent Document DE 22 10 088 C2. In order to hire a vehicle from the pool of vehicles, a user must prove his identity at one of the communication pillars provided at each hire station, for example by means of a user-specific code card. When successful identification has occurred, the communication pillar issues driving authorization for a vehicle which is ready to be picked up at the collection and return point, for which purpose it can be constructed for example as an automatic key-issuing machine which ejects the respective vehicle key. Conversely, when returning the vehicle the automatic key-issuing device takes back the respective key at one of the collection and return points. The communication pillars have a communication link to a central monitoring and recording station in order to record the period for which a vehicle in use has been hired from the departure and arrival times interrogated via the communication pillars, and to indicate the resulting hire charge.

At the same time, different vehicle keys can be assigned to the vehicles. Preferably, the vehicle keys are stored in series in the communication post according to the sequence in which they are given out at the respective communication post, and are issued again as required. The vehicles are parked one behind the other, in a sequence corresponding to their arrival, on stands in which in the case of electric vehicles for example they can be simultaneously charged. In this case, the function of monitoring the number of vehicles in the individual collection and return point can also be assigned to the central station so that when there is a shortage of vehicles at a collection and return point, one or more vehicles can be carried along coupled to a vehicle which is departing from another collection and return point and travelling to this collection and return point. However, in this known system, the user does not have the possibility of selecting a specific vehicle of the pool of vehicles for a desired journey.

A hire vehicle transport system described in the German Patent Document DE-OS 42 27 969 A1 dispenses with setting up prescribed collection and return points. Instead, in this system the vehicles of the pool of vehicles themselves have a communication link to a control center in order, for example, to carry out billing. Via the communication link the operational status of the vehicles can also be continuously tested by the control center when required in order to detect servicing requirements. All the vehicles contain a controlling and monitoring unit which tests the use authorization of a user. Each vehicle of the pool of vehicles can be activated with a code card of an authorizing system user, it being possible for a person who is currently using the vehicle to block the vehicles against being taken over by another user by means of an occupied signal.

Preferably, the vehicles are equipped with a navigation system which communicates with the central control system so that it is possible for the control center to locate the vehicles from the pool. Nevertheless, in this system, in which the vehicles are parked at any desired locations at the end of the hire period, it is not ensured that a vehicle is available for a user at a specific point at a specific time. Instead, the user must search for the vehicles, and it is also impossible for the vehicles to be assigned individually to the respective user.

German Patent Document WO 89/04901 25 discloses a parking system with a multiplicity of parking spaces, an entry level for parking vehicles and an exit level for picking up vehicles, together with a conveying device for conveying a vehicle from the entry level to a parking space and, in turn, from there to the exit level. In order to control the system, an electronic data processing system is provided, into which a respective system user inputs the expected duration of parking, and which detects the occupied state of the parking spaces by means of sensors. The data processing system controls the conveying device according to a prescribed program in such a way that the respective vehicle is conveyed to the exit level before the input picking-up time. After the parking fee has been paid, an automatic payment machine connected to the data processing system indicates the location of the vehicle to be picked up in the exit level.

One object of the invention is to provide a hire vehicle transport system of the type mentioned above, which is automated to such an extent that system users can select and reserve a vehicle from among those available in the pool, and, if necessary, can use a specifically desired vehicle or type of vehicle.

This object is achieved by means of the hire vehicle transport system according to the invention, in which the control center is configured as a disposition center which ascertains the individual availability of vehicles at the collection and return points and makes reservations for individual vehicles using the availability analysis. At the same time, the control center can carry out spontaneous vehicle hire procedures for vehicles which have not been reserved.

In addition to the above mentioned advantages of the generic hire vehicle transport system, the hire vehicle transport system according to the invention has the further advantage that, by configuration of the control center as an intelligent disposition center, it is possible to reserve a selected vehicle for a desired journey, and to use it after collection at the corresponding collection and return point. For this purpose, the disposition center uses information from the automatic collection and return machinery to monitor the presence of the vehicles from the vehicle pool at the respective collection and return points on the basis of the individual vehicles. Furthermore, the disposition center can be addressed by the user to make a reservation, after which it can inform the user about the instantaneous situation of the vehicles present at the respective collection and return points in question and, in response to a reservation request, couple the issuing of the driving authorization for the reserved vehicle to the inputting of the user identity relating to the person making the reservation. Thus, it is ensured that the user also actually finds the desired vehicle at the desired collection and return point at the desired time, and can activate it.

In a first embodiment of the invention, communication between the user and disposition center for the purpose of reserving a vehicle takes place via an information transmission channel which is independent of the collection and return point, for example via the telephone network, or via corresponding dialogue interfaces at the automatic collection and return machinery. The latter makes it possible, in particular, for the user to select one of the free vehicles then parked at the collection and return point at which the journey is to be begun in order to begin his journey immediately.

In another embodiment of the invention the driving authorization issued by the automatic collection and return machinery comprises a chip card which is coded for a specific vehicle, and which serves as access authorization for the selected vehicle. In order to activate the vehicle, a customary ignition key can be stored in the vehicle. Alternatively, the vehicle may be started by means of the vehicle-specific coded chip card way or, additionally, for an immobilizer which is present to be disarmed using the card.

In still another embodiment of the invention, vehicle operating data collected and stored on the vehicle-specific coded card and can be read out by the automatic collection and return machines and transferred to the disposition center in order, for example, to detect servicing requirements.

A further embodiment of the invention offers increased protection against unauthorized use of the vehicle, in that the maximum duration of a hire period is stored on the chip card and is called up on the vehicle side by a locking system control unit. When the period of use is exceeded, the locking system control unit prevents the vehicle from being opened again after it has been parked.

Another embodiment of the invention also serves for increased protection against use by third parties in that the vehicles are equipped with immobilizers which are set when the maximum period of use is exceeded.

In yet another embodiment of the invention the monitoring of the vehicle by the disposition center is improved in that the current position of the vehicle is determined at the vehicle end by locating means and corresponding position information is then transmitted to the disposition center by the vehicle. This permits the disposition center to make an even more reliable prediction of when specific vehicles will be present at specific collection and return points than would be possible solely on the basis of a user stating his destination collection and return point when beginning his journey.

In still another embodiment of the invention serves to protect the hire vehicle transport system is protected against unauthorized use of stands at the collection and return points and/or unauthorized access to the collection and return point area by persons not authorized to use vehicles.

Other objects, advantages and novel features of the present invention will become apparent from the following detailed description of the invention when considered in conjunction with the accompanying drawings.

DETAILED DESCRIPTION OF THE DRAWINGS

Figure 1:
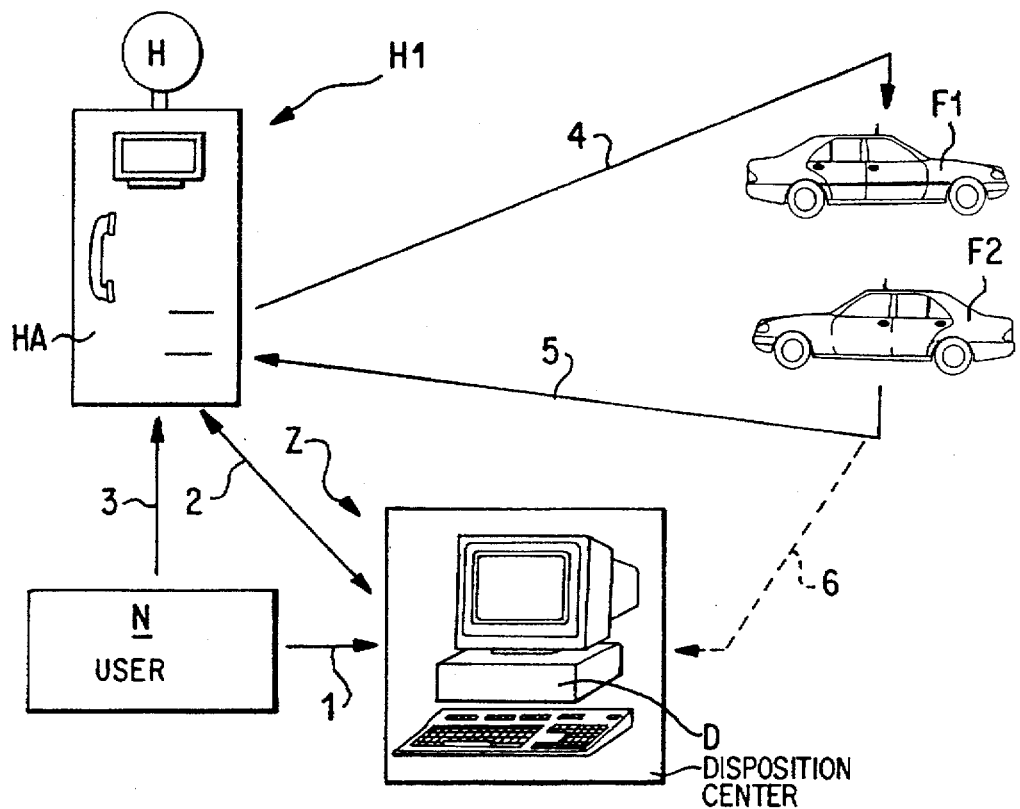
FIG. 1 shows a diagrammatic depiction of part of a hire vehicle transport system according to the invention.

The structure of the hire vehicle transport system will be explained with reference to FIG. 1. The system includes a disposition center (Z) with a disposition computer (D) which is illustrated in the figure, a plurality of collection and return points, one of which (H1) is represented as an example, the collection and return points each having an automatic collection and return machine (HA) and a pool of vehicles with a multiplicity of vehicles (of which two F1, F2 are illustrated in the figure by way of example). A user (N) of the system can contact the disposition center (Z) via a customary telephone line (1). When he is present at the collection and return point (Hi), the user (N) can establish a communication link (3) with the automatic collection and return machine (HA) by means of a user identification card which identifies him as an authorized user of the system, and which can be inserted into a corresponding card reader on the automatic collection and return machine (HA). Additionally, the user (N) can communicate with the disposition center (Z) via a telephone line including a modem.

Via the telephone network link (1) to which the computer (D), or alternatively a telephone answering machine, can be connected directly at the disposition center (Z) instead of a voice link, the user (N) can reserve in advance a desired vehicle or a desired type of vehicle from the pool of vehicles for a desired hire journey at a time to be stated. Such reservation made, a chip card associated with the selected vehicle is issued after the user (N) making the reservation has proved his identity using his user identification card at the respective automatic collection and return machine (HA). A communication link (2) is provided between each automatic collection and return machine (HA) and the disposition center (Z), via which link information can be transmitted bidirectionally between these units (HA, Z).

Each automatic collection and return machine (HA) is furthermore equipped with a card issuing unit and a card return unit with which it issues and takes back driving authorizations in the form of vehicle-specific coded chip cards. Each vehicle (F1, F2) is equipped with a card reader on the driver's door for the insertion of such a contactless vehicle-specific coded chip card. By inserting the chip card assigned to a respective vehicle into the card reader, the vehicle is opened and an existing immobilizer is disarmed, i.e. the ignition is enabled. So that the battery of the vehicle is not continuously loaded, the vehicle-side card reader is only activated by means of a mechanical microswitch after the chip card has been inserted. The vehicle is also locked by means of the chip card without conventional mechanical locking system being required. The starting and switching off of the engine takes place in a customary manner by means of an ignition key which is stored in the glove compartment when the vehicle is not in use. A warning buzzer sounds if an attempt is made to lock the vehicle, by inserting the card into the card reader on the side of the driver's door, when the ignition has not been switched off correctly.

Vehicles of the pool of vehicles which are not in use are located on stands set up at each collection and return point (H1). A suitable enclosure ensures in each case that no other vehicles occupy the stands. This is also ensured by the fact that it is only possible to enter the stand area of the respective collection and return point (H1) by passing through a barrier which can only be opened by reading in the vehicle chip card. For this purpose, the vehicle chip card contains a vehicle pool-specific code by means of which it is possible to detect at the barrier whether the vehicle belongs to the pool of vehicles. Exit from the stand area is ensured by a barrier which is opened by an induction loop.

Driving-authorizing vehicle chip cards whose associated vehicles are ready to be picked up at each collection and return point are stored in the corresponding automatic collection and return machine, ready to be issued. If the presence of an authorized use request is reported back to an automatic collection and return machine (HA) by the disposition computer (D), the machine issues the chip card associated with the desired, requested vehicle. Analogously, the automatic collection and return machine (HA) takes back, by means of its card pull-in mechanism, the vehicle chip card of a vehicle parked at the respective collection and return point after the end of the hire period. Each automatic collection and return machine (HA) is also equipped with a printer which can be used, after the termination of a hire journey and return of the vehicle chip card, to issue a receipt for the hire charge incurred while the rest of the billing process is carried out via the disposition center (Z).

Optionally, each collection and return point (H1) is equipped with a video monitoring means, signals from the video camera being transmitted to the disposition center (Z) via the data exchange link (2) between the collection and return point (H1) and the said disposition center (Z). Furthermore, each collection and return point (H1) is optionally protected against the entry of nonauthorized persons by an access-controlling turnstile, which is released by inserting the respective vehicle chip card.

In addition to booking and cancelling reservations, the functions of apportioning hire orders, i.e. ascertaining the time and location of the issuing and return of a vehicle as well as the identity of the vehicle by means of correspondingly supplied information from the respective automatic collection and return machine (HA)), billing, (i.e. determining the hire fee and presenting the bill), subscriber administration, occupation of collection and return points and availability testing, are also carried out in the disposition center (Z) using the software of the disposition computer (D) there. Subscriber administration includes the administration of user identification numbers of authorized system users and the checking of the user authorization when a vehicle is hired. For this purpose the automatic collection and return machine (HA) passes on the corresponding data to the disposition center (Z) after a user identification card has been inserted. The disposition center (Z) tests this data and, in the case of an authorized use request, transmits back an enabling instruction for the issuance of the corresponding vehicle chip card.

The collection and return occupation function determines how many vehicles are in transit and how many vehicles are freely available or reserved at the respective collection and return point. Whenever a user makes a vehicle request, this function determines whether the desired vehicle is available at the desired location at the desired time. In addition to the computer (D) (for example a PC with monitor), and the communication interfaces with a modem which may be required, the disposition center (Z) expediently has also at least one printer.

Each vehicle of the pool of vehicles is equipped with a satellite locating device, comprising a GPS receiver, Modacom terminal and aerial; so that location data may be transmitted to the disposition center (Z) by means of the Modacom terminal via a radio link (6). At the disposition center (Z) the current positions of the vehicles of the pool of vehicles can then be indicated, for example on a map on the computer screen. In addition, the location data can also be used, by means of appropriate evaluation, to determine the route which has been taken during a hire journey, so that this route can be entered in the billing, in addition to the length of the hire period.

Via the optional mobile communication link (6) between the vehicles and the disposition center (Z), which is not absolutely required for the system, it is furthermore possible to inform the disposition center (Z) of faults in the vehicles and/or to transfer vehicle operating data which can be evaluated at the disposition center (Z) in order to determine, for example, servicing intervals. The vehicle/disposition center communication link (6) can also be bidirectional in order, for example, to disable a vehicle reported as stolen by setting the immobilizer under remote control from the disposition center (Z) after the ignition has been switched off.

As an alternative to collecting vehicle operating data via the vehicle/disposition center communication link (6), by correspondingly configuring the vehicle chip card and the associated card reader, vehicle operating data may also be stored on the chip card itself, and read out at the automatic collection and return machine (HA) when the chip card is returned, as symbolized in FIG. 1 by the arrow (5). This data can then be transmitted from there to the disposition center (Z) via the associated data exchange link (2). In this manner, information permitting optimum care and servicing of the vehicles in the pool can be obtained.

Furthermore, the maximum hire period may be stored on the vehicle chip card and transferred to the locking system control unit of the vehicle via the vehicle-side card reader after the card has been issued, symbolized in FIG. 1 by the arrow (4). The locking system control unit then ensures that the vehicle is deactivated after the ignition is switched off when the maximum period of use has expired. As a further option in each case a vehicle-mounted computer with associated VDU is provided in each vehicle in the pool in order to provide user guidance and instruction on using the hire vehicle transport system.

Figure 2:
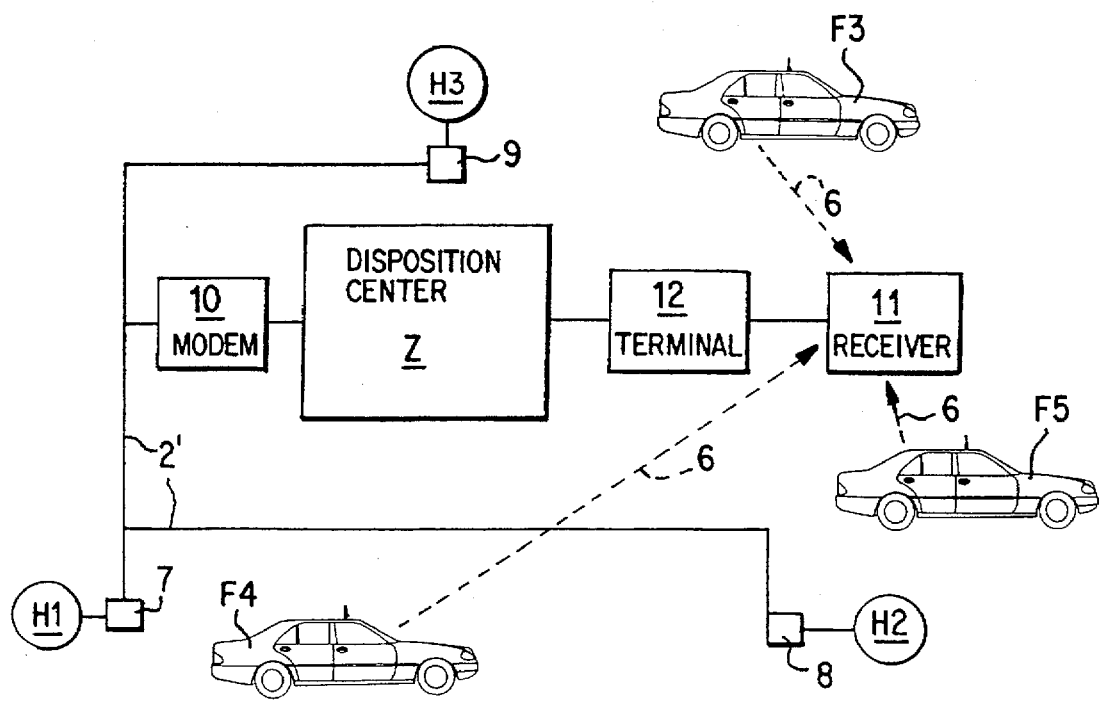
FIG. 2 shows a block diagram of part of the hire vehicle transport system according to FIG. 1, which illustrates the various communication links.

FIG. 2, shows the communication infrastructure of the system in FIG. 1 in somewhat greater detail. For example, in addition to the disposition center (Z), three collection and return points (H1, H2, H3) are assumed and three vehicles (F3, F4, F5) are shown by way of example. Each collection and return point (H1, H2, H3) is connected to a dedicated network (2') via a modem (7, 8, 9) at the collection and return end. The control center (Z) is connected to the dedicated network (2') at the other end by means of a modem (10) so that the control center (Z) can communicate individually with each collection and return point (H1, H2, H3). Via a Datex-P terminal (12) the disposition center (Z) is connected to a Modacom base unit (11) which forms the reception side of the radio link (6) between the latter and the individual vehicles (F3, F4, F5) of the pool of vehicles for the transmission of the location information. In this figure the interfaces of the disposition center (Z) and of the individual collection and return points (H1, H2, H3) for interaction with the system users are not illustrated in greater detail.

Referring to the figures, in particular also to FIG. 3, the use of the system is explained in greater detail with reference to a hire journey of a vehicle (F4) from a starting collection and return point (H1) to a different destination collection and return point (H2).

The system user can reserve the desired vehicle (F4) in advance by contacting the disposition center (Z) by telephone, stating his name and/or his system user identification, the starting collection and return point H1), the expected time of hiring the vehicle there, the destination collection and return point (H2) and the expected time of returning the vehicle there. The disposition center (Z) checks the user authorization and the availability of possible vehicles for the desired journey. The user can then select a desired vehicle if he wishes, being informed by the disposition computer about the current and future planned availability of vehicles and free parking places at the individual collection and return points. Alternatively, the user may go directly to the disposition center (Z) and place the reservation order there. If the vehicles in the pool are optionally equipped with the satellite locating device, the user can then have the current positions of the vehicles displayed to him on a map, or city map, on a screen, which can give him further help in selecting the vehicle for the hire journey. When the reservation is made, the computer (D) couples the issuing of the chip card for the desired vehicle (F4) to the inputting of the user identity of the reserving user at the respective automatic collection and return machine until the desired journey is begun. Thus the vehicle is blocked to other system users.

At the booked hiring time the user goes to the corresponding starting collection and return point and identifies himself at the automatic collection and return machine (HA) by reading in his user identification card. By means of the dedicated line (2) the automatic collection and return machine (HA) transfers the user identification data to the disposition center (Z) where it tests for an existing reservation. If the identification test is successful, the disposition computer (D) selects a vehicle from the group of associated collection and return points (if appropriate the reserved vehicle), and transmits back a corresponding chip card issuing signal to the automatic collection and return machine (HA) which causes it to issue the associated, driving-authorizing vehicle chip card. At the same time, the automatic collection and return machine (HA) reports the time when the chip card was issued, the identity of the collection and return point and the identity of the vehicle to the disposition center (Z).

The user takes the vehicle chip card from the automatic collection and return machine (HA) and inserts it into the card reader on the driver's door of the associated vehicle, actuating the central locking system so that the vehicle can be opened. The vehicle can then be activated with the ignition key lying in the vehicle. (It is of course possible as an alternative for the ignition key to be dispensed with, and instead a starter knob to be actuated.) The user leaves the starting collection and return point (H1) with his vehicle (F4) by passing the exit barrier actuated by means of induction loops.

Figure 3:
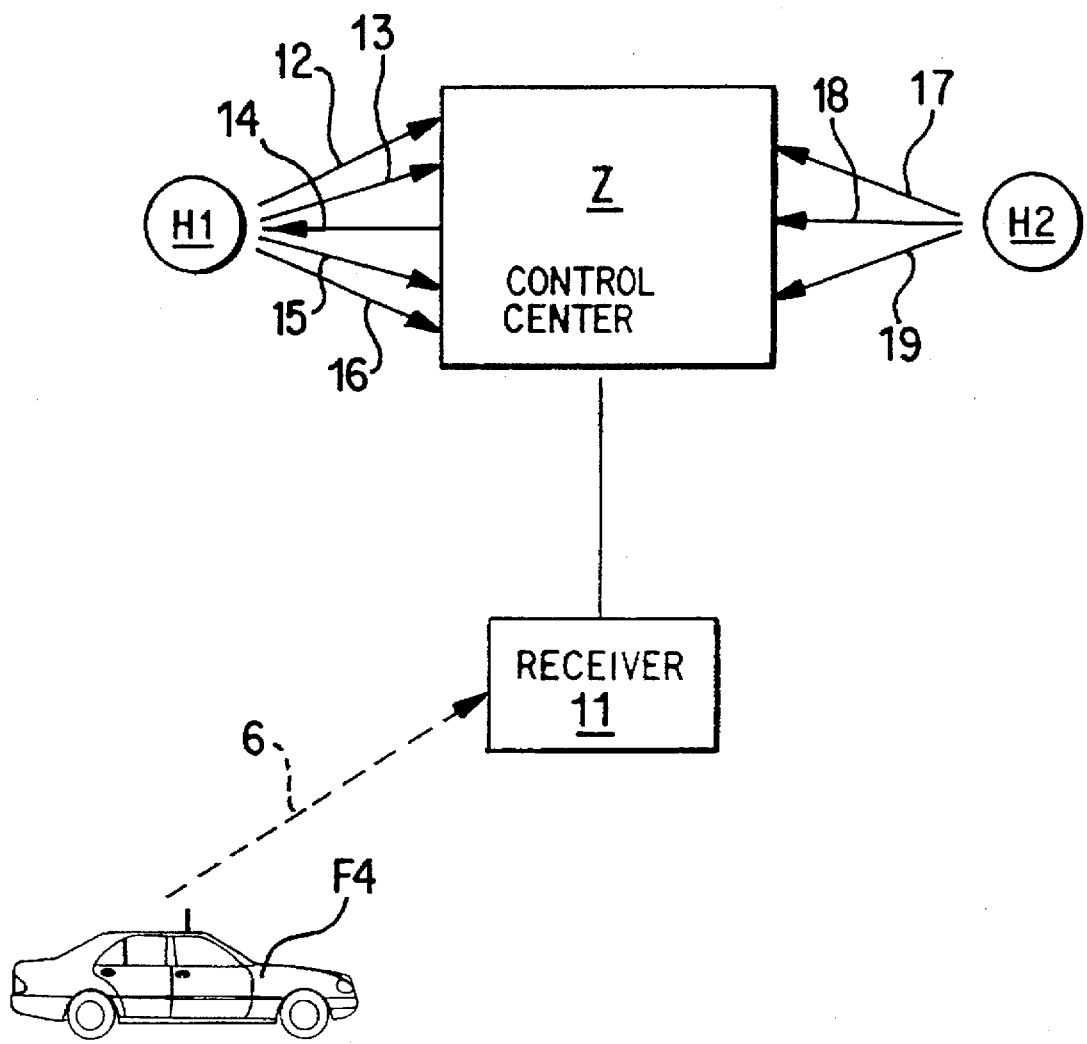
FIG. 3 shows a diagrammatic depiction of part of the hire vehicle transport system according to FIG. 1, which illustrates typical sequences in the exchange of information between the collection 10 and return points and the disposition center of the hire vehicle transport system according to FIG. 1 while a vehicle is being hired or returned.

In the left-hand half of FIG. 3 the exchange of information between the starting collection and return point (H1) and the control center (Z) is illustrated diagrammatically by means of the sequence comprising the setting up of the link (12), the transfer of the user identification (13), the reporting back on the authorized use request (14), the transferring of the time of issuing and the identity (15) of the collection and return point and vehicle and the dissolution (16) of the link.

During the journey, if appropriate, location data are transferred via the radio link (6) to the Modacom base unit (11) and from there to the control center (Z). When the vehicle arrives at the destination collection and return point (H2), the entry barrier must be initially actuated by inserting the vehicle chip card into the barrier-side card reader. After the vehicle (F4) is parked in a free stand in the collection and return area, the vehicle is locked again with the vehicle chip card, which is then returned via the card pull-in mechanism of the automatic collection and return machine (HA) there. It is thus ensured that each automatic collection and return machine contains, at any one time, precisely the chip cards of the vehicles located in the associated collection and return area.

When the vehicle chip card is returned, the automatic collection and return machine reads the identity of the vehicle and transmits this information, together with the identity of the collection and return point and the time of return, to the control center (Z). This communication sequence is illustrated diagrammatically on the right-hand half of FIG. 3, which shows the establishment of the link (17), the actual transmission of data (18) and the dissolution (19) of the link. In the control center (Z), the received data are evaluated together with the data received from the starting collection and return point (H1) in order to carry out billing, the point of departure and destination as well as the period of use and possibly also the route covered, detected by means of the location data, also being included, if desired, in the calculation of the hire charge.

In order to achieve a public individual transport system, as an alternative to the above-described advance reservation of a vehicle from the pool of vehicles, it is also possible to provide for spontaneous hiring of a vehicle without previous reservation or booking. For this purpose, the user goes directly to the desired starting collection and return point when he wishes to begin a journey. There he communicates with the control center (Z) from the automatic collection and return machine (HA) via the dedicated telephone line, and at the same time proves his identity as an authorized system user at the automatic collection and return machine by entering his user identification card. By means of the dialogue carried out with the control center (Z) he then hires one of the vehicles present at the collection and return point at that time, in the same manner as described above when a reservation has been made. Of course, in contrast with advance reservation, he has only a reduced selection, in comparison with reserving in advance, among the free vehicles which are there at that instant. After a free vehicle is assigned, the rest of the sequence of hiring a vehicle takes place in the same way as described above for the case of a vehicle reserved in advance.

The system described above offers an efficient and cost-effective way of making vehicles available individually, even for short periods. The vehicle does need to be returned at the location where it is hired. Advantageously, the system offers the possibility of reserving individual vehicles. Furthermore, it is to be emphasized that the system does not necessarily require any communication link between the individual collection and return point and the vehicles. Furthermore, in this system it is possible either to reserve a vehicle, or to hire one spontaneously. The collection and return points are completely automated so that no personnel are necessary there. The control center itself can also be completely automated if required and operate without personnel. It is also advantageous that the driving authorizations can be issued on a vehicle-specific basis so that a vehicle hired by a user cannot be operated by other system users.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hire vehicle transportation system comprising:

a pool of vehicles which are available for hire;

at least one collection and return point at which the vehicles are issued and taken back;

an automatic collection and return device at each of said at least one collection and return point, for receiving and checking proof of user identity of a prospective user, issuing a driving authorization unit for a vehicle parked there in response to a positive authorization check, and receiving the driving authorization unit for vehicles returned there; and a disposition center which has a communication link with each automatic collection and return device, for transmitting at least issuing and return times;

wherein said disposition center comprises a disposition computer which is programmed to test user authorization based on user identity data supplied to it by the automatic collection and return device, evaluate individual availability of vehicles at the at least one collection and return point taking into account vehicle-specified rental information supplied to it by the automatic collection and return device, and receive vehicle reservation requests;

wherein, to make a reservation, the disposition computer assigns a selected vehicle, which is available at a desired starting collection and return point, specifically to an authorizing identity of a reserving user until the time when the journey is to begin; and wherein, after a successful user authorization check of an authorized user, the disposition computer outputs an instruction signal to a corresponding automatic collection and return device to issue a driving authorization unit for the vehicle reserved for the authorized user or, in the absence of a reservation, for a vehicle not yet reserved.

2. Hire vehicle transportation system according to claim 1, further comprising at least one of a communication link which is independent of said at least one collection and return point, between a user and the disposition center, and a dialogue interface which is connected to the communication link between the automatic collection and return device and the disposition center, and can be actuated by the user, through a respective automatic collection and return device in order to exchange information between the user and the disposition center for hiring a vehicle.

3. Hire vehicle transportation system according to claim 1, wherein driving authorizations which are issued comprise chip cards which are coded to correspond to a particular assigned vehicle and which in each case enable access to the assigned vehicle.

4. Hire vehicle transportation system according to claim 3, wherein vehicle operating data collected on a vehicle chip card can be stored and read out by the automatic collection and return device when the chip card is returned, and can be transferred to the disposition center.

5. Hire vehicle transportation system according to claim 3, wherein information relating to the maximum period of use can be stored on the vehicle chip card and is transmitted to a locking-system control unit of the vehicle when a journey is begun, said locking-system control unit blocking further access authorization with the chip card after the vehicle has been parked when a maximum period of use has expired.

6. Hire vehicle transportation system according to claim 5, wherein said vehicles are equipped with immobilizers which are activated when the maximum period of use has expired.

7. Hire vehicle transportation system according to claim 1, wherein said vehicles are equipped with a satellite locating device and a wireless communication link for transferring at least locating data from the vehicles to the disposition center.

8. Hire vehicle transportation system according to claim 1, wherein vehicle access to the at least one collection and return point is possible only via an entry control barrier, which can be activated by means of the vehicle chip cards.

9. Hire vehicle transportation system according to claim 8, wherein pedestrian access to the at least one collection and return point can be obtained only via an entry control barrier, which can be activated by means of the vehicle chip cards.

* * * * *